United States Patent [19]
Lange et al.

[11] Patent Number: 4,705,571
[45] Date of Patent: Nov. 10, 1987

[54] FILLING COMPOUND FOR OPTICAL WAVEGUIDE BUFFER AND/OR OPTICAL WAVEGUIDE CABLES

[75] Inventors: Gerhard Lange; Erich Weil, both of Munich, Fed. Rep. of Germany

[73] Assignee: Siemens Aktiengesellschaft, Berlin and Munich, Fed. Rep. of Germany

[21] Appl. No.: 881,950

[22] Filed: Jul. 3, 1986

[30] Foreign Application Priority Data

Jul. 5, 1985 [DE] Fed. Rep. of Germany ....... 3524166

[51] Int. Cl.$^4$ ............................................. H02G 15/00
[52] U.S. Cl. ............................ 106/287.1; 106/287.16; 252/78.3; 523/173
[58] Field of Search ............. 106/15.05, 287.1, 287.16; 523/173; 252/78.3

[56] References Cited

U.S. PATENT DOCUMENTS 3,893,962 7/1975 Walton et al. ................. 260/28.5 A
4,366,075 12/1982 Beach .................................... 252/28

FOREIGN PATENT DOCUMENTS 0067009 12/1982 European Pat. Off. .

Primary Examiner—Theodore Morris
Attorney, Agent, or Firm—Hill, Van Santen, Steadman & Simpson

[57] ABSTRACT

A filling compound for light waveguide leads and/or light waveguide cables. The filling compound consists of polyglycol and/or polyolefin, fumed silica, and a multi-functional silane compound. Preferably the filling compound comprises approximately 63 and 99 weight percent polyglycol and/or polyolefin, approximately 27 to about 0.5 weight percent finely distributed fumed silica as a filler and approximately 10 to about 0.5 weight percent of a multi-functional silane compound as a crosslinking/coupling component.

24 Claims, 2 Drawing Figures

FILLING COMPOUND FOR OPTICAL WAVEGUIDE BUFFER AND/OR OPTICAL WAVEGUIDE CABLES

BACKGROUND OF THE INVENTION

The present invention relates generally to optical cables that include a strand element consisting of several light waveguides for the transmission of optical signals or light waves. Specifically, this invention relates to a filling compound for light waveguide leads or optical waveguide buffer tube and/or light or optical waveguide cables.

Typically, several light waves guides leads, for the transmission of optical signals or light waves, are disposed within a protective casing defining a light waveguide cable. Each light waveguide lead typically consist of a coated fiber surrounded by a sheath. As disclosed in U.S. Pat. No. 4,331,379 the space between the light waveguide leads and the protective casing can be filled by a compound that may consist of a thixotropic additive or oil. The space between the fibers and the protective sheath in the light waveguide lead may also be filled by a filling compound.

Prior filling compounds have not been entirely successful. This is due, in part, to the fact that requirements of the filling compounds are, in part, contradictory. It is desirable for a filling compound to exhibit the following properties:

(a) The filling compound must retain its properties over a wide temperature range, for example from −40° C. to +70° C.; accordingly, the filling compound should not exhibit an excessive hardness at low temperatures that will cause a mechanical stressing of the light waveguides due to an excessive increase of the viscosity nor should the filling compound exhibit a phase separation of the fluid phase from the solid phase (i.e., a drip-out from the cable) at high temperatures, (b) the filling compound should have a low viscosity at room temperature in its unprocessed condition in order to enable the filling of cables during the cable manufacture operation even through cables and leads having a small inside diameter and at low excess pressure, (c) the filling compound should avoid the build-up of tensile or compressive forces in the light waveguide leads as much as possible, an increase tensile or compressive force will cause the light waveguide leads to attenuate, (d) the filling compound should exhibit an optimally low moisture absorption tendency, (e) the filling compound should be compatible with and not exhibit a detrimental effect on any of the materials it will contact, i.e., the protective sheath, casing, and the fiber coating, (f) the filling compound should be resistant to aging, both in a chemical and in a physical sense.

It is known that fumed silica compounds have silanol groups on their surface that have a tendency to bond with adjacent particles of the matrix via weak hydrogen bondings. When using thixotropic oils (fumed silica+oils) as filling compounds, the weak hydrogen bondings are broken, at low energy influences; the fumed silica separates from the matrix. The separation of the fumed silica from the matrix results in a substantial decrease in viscosity. The separation of the fluid phase (oil) from the solid phase (fillers) is further intensified when the filling compound is used to fill the optical waveguide buffer tube because of the capillary forces in the optical waveguide buffer tube. As a result, the fluid phase easily drips out. This further results in the remaining portion of the filler compound having a greater viscosity than the original filling compound causing it to exert a pressure on the optical waveguide buffer, thereby causing the fiber to attentuate. Because of these contradictory demands on the filling compound, e.g. the requirement that the filling compound have a solid consistency on the one hand in order to prevent drip-out and on the other hand have a low-viscosity in order to keep the mechanical stressing of the light waveguides and, thus, the attenuation of the fibers, low—most filling compounds have not functioned satisfactory in light waveguide leads and cables. Accordingly, there is a need for an improved filling compound for light waveguide leads and cables.

SUMMARY OF THE INVENTION

The present invention provides a filling compound for light waveguide leads and cables. To this end, a filling compound that meets the demands set forth above, but which is still easy to process, is provided. In accordance with the present invention, the filling compound comprises a polyglycol and/or liquid polyolefin, finely distributed fumed silica, and a multi-functional silane compound.

Preferably, the filling compound comprises between approximately 63 to about 99 weight percent polyglycol and/or a liquid polyolefin; between approximately 27 to about 0.5 weight percent finely distributed fumed silica; and between approximately 10 to about 0.5 weight percent of a multi-functional silane compound. The fumed silica acts as a filler and the multifunctional silane compound is provided, to effect, on the one hand, a chemical bonding between the filler and the polyglycol and/or the polyolefin and, on the other hand, a chemical bonding of the fluid phase.

In an embodiment of the invention, the polyglycol comprises polypropylene glycol. The silane compound can include vinyl groups, epoxy groups, alkoxy groups, and the like. Preferably, the silane derivatives useful in the filling compound of this invention comprises low-dialkyl or low-trialkoxy silanes that have a vinyl or epoxy substituent in the alkyl group.

In a preferred embodiment, the filling compound includes an antioxidant.

In a preferred embodiment, when the filling compound is employed as a filler for a light waveguide lead it can comprise: approximately 94 to about 99 weight percent polyglycol or polyolefin; approximately 4 to about 0.5 weight percent fumed silica and approximately 2 to about 0.5 weight percent silane.

In a preferred embodiment, when the filling compound is employed as a filler for a light waveguide cable it can comprise: approximately 78 to about 95.5 weight percent polyglycol or polyolefin; approximately 20 to about 4 weight percent fumed silica and approximately 2 to about 0.5 weight percent silane.

DETAILED DESCRIPTION OF THE PRESENTLY PREFERRED EMBODIMENTS

Figure 1:
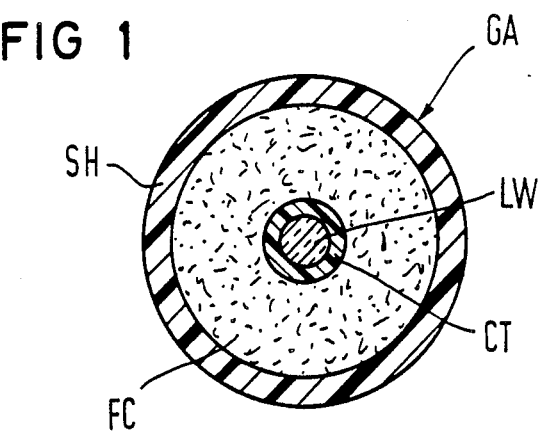
FIG. 1 illustrates a cross-sectional view of a filled light waveguide lead of the present invention.

A filling compound for light waveguide leads and/or cables is provided. The filling compound meets the requirements set forth in the background of the invention and can be utilized to fill the space between the fibers and protective casing in the light waveguide lead or the space between the waveguide lead and the protective casing in the light waveguide cable.

The filling compound comprises a polyglycol and/or liquid polyolefin, finely distributed fumed silica, and a multi-functional silane compound. Preferably, the polyglycol and/or liquid polyolefin comprises between approximately 63 to about 99 weight percent of the filling compound, the finely divided fumed silica comprises between approximately 27 to about 0.5 weight percent of the filling compound, and the silane compound between approximately 10 to about 0.5 weight percent of the filling compound.

The multi-functional silane compound affords a filling compound that maintains its properties across a wide temperature range and is easily filled into the cables or leads. The multi-functional silane compound produces crosslinking between the matrix (i.e. the polyglycol and/or polyolefin) and the filler surface (i.e. the silane groups thereof). The crosslinking between the matrix and filler provides a skeleton structure that makes a separation of the fluid phase impossible while simultaneously effecting a stable gel bonding.

An excess amount of polyglycol and/or liquid polyolefin is provided in the filling compound. Accordingly, after the polyglycol and/or polyolefin has reacted with all the silane available in the filling compound to create a supporting skeleton structure, an excess amount of polyglycol and/or polyolefin is still present in the filling compound. This excess amount of polyglycol and/or polyolefin helps to provide the filling compound with the desired properties set forth in the background of the invention.

Due to the time delay in the re-gelling of the filling compound of the present invention, an especially easy processible filling compound is provided. Accordingly the filling compound can fill, for example, buffer tubes having an inside diameter between 0.5 and 5 mm at an excess pressure of only a few bars. Because only slight excess pressures are required to fill the leads or buffer tubes with the filling compound of the present invention, no mechanical stressings of the light waveguide fibers occurs during the filling process of the light waveguide leads.

Moreover, the filling compound of the present invention also provides a filling compound that is an especially time-stable compound due to the fumed silica. As stated above, preferably the filling compound comprises between approximately 27 and to about 0.5 weight percent fumed silica. In a most preferred embodiment, the fumed silica comprises approximately 2 weight percent of the filling compound when it is used to fill light waveguide leads. Preferably, the fumed silica is finely distributed having agglomerates that are preferably less than 10 microns in size.

Typically fumed silica is inherently hydrophilic. In the filling compound of the present invention, especially advantageous results can be achieved when fumed silica is utilized that has been modified to be hydrophobic. This results in the surface tension being modified such that, together with the aforementioned skeleton structure, the gel phase remains fixed and does not drip out even under extreme conditions of long duration. In a further preferred embodiment of the invention both hydrophilic fumed silica as well as fumed silica that has been rendered hydrophobic are utilized. By utilizing hydrophilic fumed silica improved bonding of the fluid phase (matrix) to the fumed silica via a chemical reaction is achieved.

The filling compound of the present invention also satisfies the requirement that the compound have a low moisture absorption. This is due to the fact that both polyglycol and/or polyolefin, as well as the aliphatic structure of the silane compound coupling component, are largely water-repellant. If desired, this property can be further intensified in accordance with an embodiment of the invention by rendering at least a portion of the fumed silica added to create the filling compound of the present invention hydrophobic. Any and all moisture absorption can be prevented by the hydrophobic property of the hydrophobic fumed silica.

The filling compound of the present invention exhibits no detrimental effect, whatsoever, on the generally employed coatings for the fibers of the light waveguide leads. Typically, the fibers of the light waveguide leads are coated with a polyurethane acrylate. Coatings of polyurethane acrylate are typically utilized to coat the fibers in light waveguides leads because they are UV-hardening and help ensure high production speeds. Accordingly, it is necessary for the filling compound to be compatible with polyurethane acrylate if the filling compound is to be utilized to fill a light waveguide lead. Because all polyglycols comprise ether groups and alcohol end groups that enable bonding through chemical reactions with the silane compounds of this invention, the polyglycols do not interact with the fiber coating (e.g. polyurethane acrylate) or with the protective sheath (e.g. polyamide) of the light waveguide lead.

The filling compound of the present invention also has excellent transparency. This is particularly true when polypropylene glycol is used as the polyglycol. By utilizing polypropylene glycol, the filling compound has a transparency substantially similar to that of glass. The transparency of the filling compound is important in that it allows one to be able to identify colored light waveguide leads from outside the light waveguide cable.

It is also especially advantageous to use polypropylene glycol in the filling compound because of its viscosity values and low gel point; polypropylene glycol has a freezing point of less than $-50°$ C. Moreover, polypropylene glycol is water soluble.

The silane compounds useful in the filling compound of the present invention can include vinyl groups, epoxy groups, and the like. In addition to vinyl groups, epoxy groups, and the like, the silane compound can comprise alkoxy groups that react with the filler compound, i.e., with the finely distributed fumed silica. An example of such a compound is as follows:

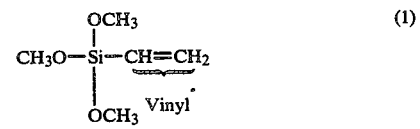

(1)

Because of steric reasons, not all of the $-Si-OR_1$ groups react when $R_1 \hat{=} CH_3$ upon bonding of the silane compound to the filler. By splitting off $H_2O$, a crosslinking of the adhesion promoter molecules ensues in addition thereto as set forth below:

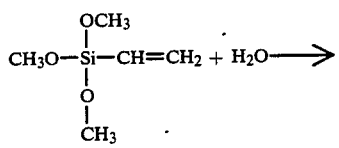
(2)

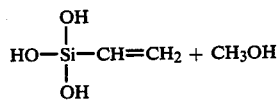

Two Si—OH groups create by hydrolysis, then react upon formation of a siloxane bond, as follows:

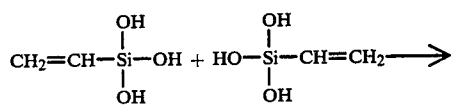
(3)

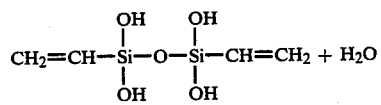

Because of the free Si—OH groups in the resultant product, the Si—OH groups between neighboring particles can react to create a hydrogen bridge bonds to the inorganic substrate in the boundary layer. These bonds are reversible and are broken by a shearing or mechanical stress of the resultant product. However, the bonds are recreated after the shearing or the stress conditions (i.e. the product re-gells). Accordingly, the following structure is thereby derived:

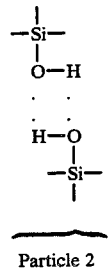

The silane derivatives employable in the filling compound of the invention are preferably low-dialkyl or low-trialkoxy silanes which preferably carry a vinyl or epoxy substituent in the alkyl group. The vinyl or epoxy substituent reacts with the neighboring carbon atoms of the ether groups or the alcohol end groups of the polyglycol.

Preferred the silane derivatives have the following, general formula:

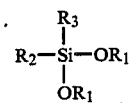
(4)

wherein $R_1$ denotes an alkyl group having 1 to 3 carbon atoms, $R_2$ denotes an alkyl having 1 to 3 carbon atoms or the group —$OR_1$, and $R_3$ denotes an alkyl group having 2 to 4 carbon atoms that is substituted with a substituent of the vinyl, epoxy, mercapto, alkoxy, or cyano- amino- carboxy-groups that are reactable with respect to the hydroxyl group.

Applicants believe that the invention is probably based on the following reaction mechanisms which enable a systematic, chemical build-up of the filling compound and accordingly allows the resultant filling compound to satisfy the required needs set forth previously.

By way of example, and for simplicity sake, the schematic explanation is only shown with reference to a vinyl silane.

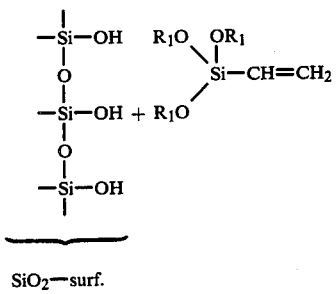
(5)

yields

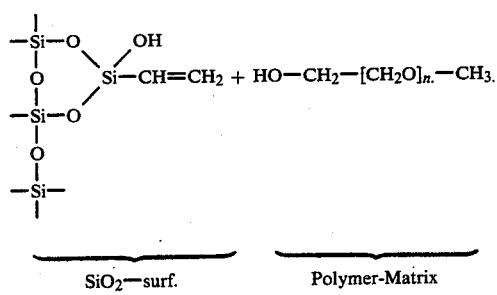
(6)

via an intermediate step according to that set forth in formula (3).

The components set forth in (6) above are then heated to a temperature of approximately 120° C. to about 170° C. for a duration of time from minutes to hours to yield the filling compound of the present invention as follows:

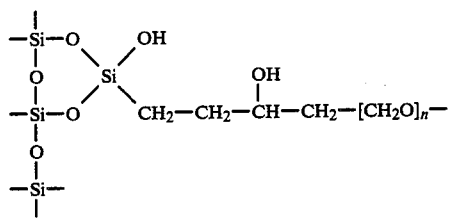

Accordingly, an embodiment of the filling compound of the invention having the desired properties is thereby created.

In a further embodiment of the invention, the reaction can be modified in order to speed up the reaction and to allow one to work at lower temperatures, radical-forming agents can be utilized as follows:

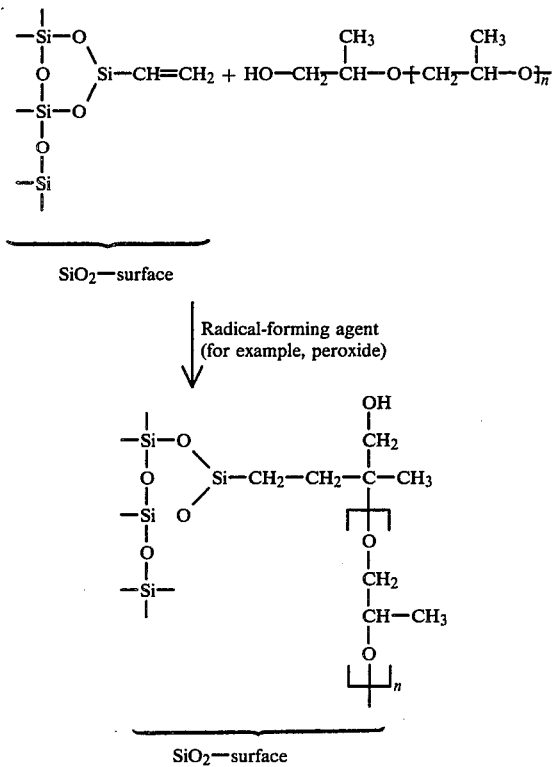

SiO₂—surface

By way of example, a reaction utilizing epoxide silane shall now be set forth:

Example:
Alkoxy epoxide silane

The reaction of SiO₂ and the alkoxy group proceeds as shown in the equation set forth as (3). The reaction of the epoxide group with the polyglycol is as follows:

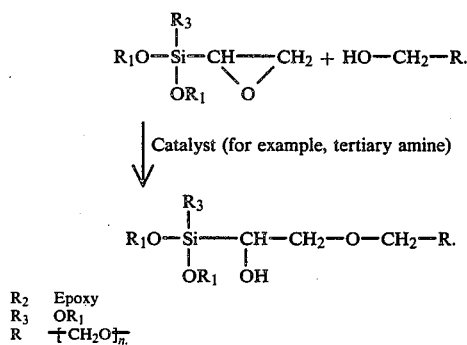

R₂ Epoxy
R₃ OR₁
R ─(CH₂O)ₙ─

Preferably approximately 10 to about 0.5 weight percent of silane is utilized; most preferably approximately 0.7 weight percent of silane is utilized.

By utilizing epoxide silanes, even three-dimensional crosslinkings can be effected, in addition to linear crosslinkings achieved when a monomeric diol (for example, ethylene glycol) is employed as an additional substance. When a monomeric diol is utilized it should comprise approximately 1 to about 10 weight percent, most preferably about 3 weight percent.

If desired, the filling compound can include an antioxidant. The antioxidant will prevent any potential, unfavorable influence of oxygen, particularly atmospheric oxygen, on the polyglycol contained in the filling compound and/or on the thixotropic agent. Preferably, an antioxidant should be chosen that easily dissolves in polyglycols. Examples of antioxidants that function satisfactorily are: polymeric 2,2,4-trimethyl-1,2-dihydroquinoline phenothiazine; octadecyl 3-(3,5-di-tert.butyl-4-hydroxyphenyl)-propionate; and hydroquinone-monomethyl ether.

Preferably the antioxidant should comprise approximately 0.1 to about 1.0 weight percent of the filling compound; most preferably 0.1 to about 0.5 weight percent; It should be noted that the antioxidant does not participate in the reaction and is only present in the physical mixture of the filling compound.

As previously stated, the filling compound of the present invention can be utilized as a filler for the space between the coating on the fiber and the protective sheath of light waveguide lead or the space between the light waveguide lead and protective casing of the light waveguide cable.

In an embodiment of the filling compound, the constituents and their weight percentages for use of the filling compound as a filler for the light waveguide lead is as follows:

| Constituents | Weight Percent |
|---|---|
| Polyglycol or polyolefin | 94 to 99 weight % |
| most preferably | 96 to 98 weight % |
| fumed silica | 4 to 0.5 weight % |
| most preferably | 3 to 0.5 weight % |
| silane | 2 to 0.5 weight % |
| most preferably | 1 to 0.5 weight % |

In a further embodiment of the filling compound, the constituents and their weight percents for use of the filling compound as a filler for filling the light waveguide cable core is as follows:

| Constituents | Weight Percent |
|---|---|
| polyglycol or polyolefin | 78 to 95.5 weight % |
| most preferably | 90 to 94.5 weight % |
| fumed silica | 20 to 4 weight % |
| most preferably | 9 to 5 weight % |
| silane | 2 to 0.5 weight % |
| most preferably | 1 to 0.5 weight % |

By way of example, and not limitation, examples of the filling compound of the present invention are set forth below. Examples 1 through 5 are based on polyglycol. Examples 1 through 3 relate to a filling compound for a light waveguide lead and examples 4 through 6 relate to a filling compound for a light waveguide cable filling compound. It is desirable for the filling compounds for a light waveguide lead to be softer than the filling compounds for a light waveguide cable core. The filling compound becomes softer, and vice versa, the higher the proportion of polyglycol and the lower the proportion of fumed silica.

EXAMPLE 1

A light waveguide lead filling compound which contains the following components was produced as follows:

| Components: | Weight % |
|---|---|
| Polypropylene glycol ("B01/300" of Hoechst) | 97 |
| Fumed silica ("Aerosil 380" of Degussa) | 2 |
| Vinyl-trialkoxy-silane ("GF56" of Wacker Chemcial) | 0.7 |
| Antioxidant ("Irganox 1076" of Ciba Geigy) | 0.3 |

The compound was well mixed in a ball mill at about 120° C. As soon as a uniform mixture was achieved, the compound was taken from the mill, cooled to room temperature and de-aerated. At 120° C., the reaction in the ball mill occurred in about 10 to 20 minutes.

EXAMPLE 2

A light waveguide lead filling compound which contains the following components was produced in accordance with the procedure set forth in Example 1:

| Components | Weight % |
|---|---|
| Polypropylene glycol ("B01/300" of Hoechst) | 97 |
| Hydrophilic fumed silica ("Aerosil 380" of Degussa) | 0.5 |
| Hydrophobic fumed silica ("HDK 20" of Wacker Chemical) | 1.5 |
| Vinyl-trialkoxy-silane ("GF56" of Wacker Chemical) | 0.7 |
| Antioxidant ("Irganox 1076" of Ciba Geigy) | 0.3 |

EXAMPLE 3

A light waveguide lead filling compound that contains the following components was produced:

| Components | Weight % |
|---|---|
| Polypropylene glycol | 96.1 |
| Hydrophilic fumed silica | 1 |
| Hydrophobic fumed silica | 1 |
| Epoxy-trialkoxy-silane ("A 187" of Union Carbide) | 1 |
| Aminic catalyst ("DMP 30" of Bakelite GmbH) | 0.5 |
| Antioxidant | 0.4 |

EXAMPLE 4

A light waveguide cable core filling compound that contains the following components was produced as follows:

| Components | Weight % |
|---|---|
| Polypropylene glycol | 77.5 |
| Hydrophilic fumed silica | 1.5 |
| Hydrophobic fumed silica | 20 |
| Vinyl-trialkyl-silane | 0.6 |
| Antioxidant | 0.4 |

The components were first stirred and were then subsequently uniformly mixed at 120° C. on a hot two-roller mixer.

EXAMPLE 5

A light waveguide cable core filling compound that contains the following components was produced in accordance with the procedure set forth in Example 4:

| Components | Weight % |
|---|---|
| Polypropylene glycol | 81.8 |
| Hydrophilic fumed silica | 1.5 |
| Hydrophobic fumed silica | 15 |
| Epoxy-trialkoxy-silane | 1 |
| Aminic catalyst | 0.3 |
| Antioxidant | 0.4 |

In the following examples 6 and 7 polyolefins were substituted for polyglycol as one of the components.

EXAMPLE 6

A light waveguide lead filling compound that contains the following components was produced.

| Components | Weight % |
|---|---|
| Polybutene | 95.7 |
| Hydrophilic fumed silica | 1.5 |
| Hydrophobic fumed silica | 1.5 |
| Vinyl-trialkoxy silane | 0.9 |
| Antioxidant | 0.4 |

EXAMPLE 7

A light waveguide cable core filling compound that contained the following components was produced.

| Components | Weight % |
|---|---|
| Polybutene | 91.5 |
| Hydrophilic fumed silica | 2 |
| Hydrophobic fumed silica | 6 |
| Vinyl-trialkoxy-silane | 0.1 |
| Antioxidant | 0.4 |

In the following examples 8 and 9 additives of monomeric diol for achieving a three-dimensional crosslinking were added:

EXAMPLE 8

A light waveguide lead filling compound was produced that contained the following components.

| Components | Weight % |
|---|---|
| Polypropylene glycol | 92.3 |
| Ethylene glycol (as a diol) | 3 |
| Hydrophilic fumed silica | 1.5 |
| Hydrophobic fumed silica | 1.5 |
| Epoxy-trialkoxy-silane | 1 |
| Tertiary amine (catalyst) | 0.3 |
| Antioxidant | 0.4 |

EXAMPLE 9

A light waveguide cable core filling compound was produced that contained the following components:

| Components | Weight % |
|---|---|
| Polypropylene glycol | 87.3 |
| Ethylene glycol (as a diol) | 3 |
| Hydrophilic fumed silica | 2 |
| Hydrophobic fumed silica | 6 |
| Epoxy-trialkoxy-silane | 1 |
| Tertiary amine (catalyst) | 0.3 |

| Components | Weight % |
| --- | --- |
| Antioxidant | 0.4 |

Referring now to the Figures, FIG. 1 illustrates a filled light waveguide lead GA in cross-section. The light waveguide lead GA includes at least one light waveguide fiber LW that includes a coating CT. The coating CT is surrounded by a light waveguide lead filling compound FC. The filling compound FC is the filling compound of the present invention that is set forth in detail above. The filling compound FC and coated fiber are surrounded by a protective sheath which comprises an extruded plastic. On the one hand, the filling compound FC should be soft enough to avoid a mechanical stressing of the light waveguide fibers LW during bending and, on the other hand, should be stable enough that a flow-out or drip-out of the filling compound is suppressed, even at higher temperatures.

Figure 2:
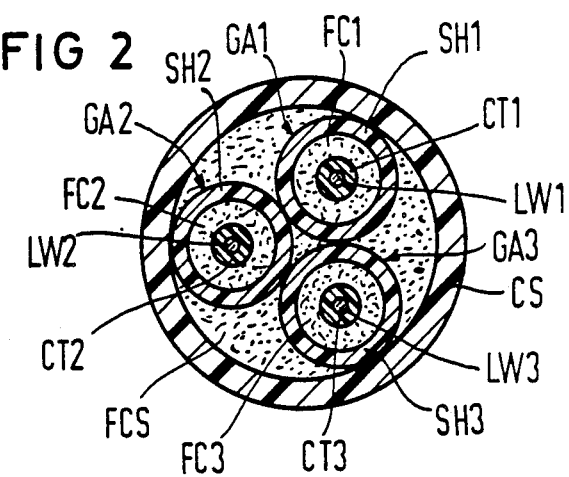
FIG. 2 illustrates a cross-sectional view of three filled light waveguide leads located in a light waveguide cable of the present invention.

Referring now to FIG. 2, a light waveguide cable is illustrated in cross-section. As illustrated, three light waveguide leads GA1, GA2 and GA3 (having the structure described in FIG. 1) are arranged inside a cable casing CS. The light waveguide leads are surrounded by a light waveguide cable filling compound FCS. The light waveguide cable filling compound FCS is the filling compound of the present invention that is set forth in detail above.

It is possible to manufacture both the light waveguide cable filling compound FCS as well as the light waveguide lead filling compound FC from the same materials. However, it is possible to provide only a light waveguide cable filling compound FCS, with the composition of the present invention and no waveguide lead filling compound FC or a different filling compound or vice versa.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications can be covered by the appended claims.

We claim:

1. A filling compound for light waveguide leads and light waveguide cables comprising:
   a first component chosen from the group consisting of:
   polyglycol; and polyolefin;
   a finely distributed fumed silica;
   a multi-functional silane compound; and
   the first component being reacted with the silane compound to form a synthetic material that provides a supporting skeleton structure.

2. The filling compound of claim 1 wherein:
   the first component comprises approximately 63 to 99 weight percent of the filling compound;
   the fumed silica comprises approximately 27 to about 0.5 weight percent of the filling compound; and
   the multi-functional silane compound comprises approximately 10 about 0.5 weight percent of the filling compound.

3. The filling compound of claim 1, wherein:
   the first component comprises between approximately 78 to about 95.5 weight percent of the filling compound;
   the fumed silica comprises approximately 20 to about 4 weight percent of the filling compound; and
   the multi-functional silane compound comprises 2 to about 0.5 weight percent of the filling compound.

4. The filling compound of claim 3 wherein:
   the first component comprises approximately 90 to about 94.5 weight percent of the filling compound;
   the fumed silica comprises approximately 9 to about 5 weight percent of the filling compound; and the silane compound comprises 2 to about 0.5 weight percent of the filling compound.

5. The filling compound of claim 1 wherein at least a portion of the fumed silica has been rendered hydrophobic.

6. The filling compound of claim 1 wherein the filling compound includes an antioxidant.

7. The filling compound of claim 6 wherein:
   the antioxidant is selected from the group consisting of: polymeric 2,2,4 trimethyl-1,2-dihydroquiniline phenothiazine; octadecyl 3(3,5-di-tert butyl-4-hydroxyphenyl)-propionate; hydroquinone-monomethyl ether; and
   the antioxidant comprises 0.1 to about 1 weight percent of the filling compound.

8. The filling compound of claim 1 wherein the fumed silica comprises agglomerates that are less than 10 microns.

9. The filling compound of claim 1 wherein the silane comprises at least one substituent chosen from the group consisting of: alkyl group; alkoxy group; vinyl group; and epoxy group.

10. The filling compound of claim 9 wherein the filling compound includes a monomeric diol.

11. The filling compound of claim 10 wherein the monomeric diol is ethylene glycol.

12. The filling compound of claim 10, wherein approximately 1 to about 10 weight percent of the filling compound is formed by the diol.

13. The filling compound of claim 1 wherein the multi-functional silane comprises a silane derivative having the formula:

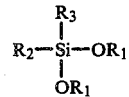

wherein $R_1$ denotes an alkyl group having 1 to 3 carbon atoms, $R_2$ denotes an alkyl group having 1 to 3 carbon atoms or the group $-OR_1$, and $R_3$ denotes an alkyl group having 2 to 4 carbon atoms that are substituted with a substituent of a vinyl, epoxy, mercapto, alkoxy, cyano- amino- carboxy groups that is reactable with respect to the hydroxyl group.

14. The filling compound of claim 1 wherein a polyglycol is utilized having a molecular weight between 2000 and 3500.

15. The filling compound of claim 1 wherein the polyglycol chosen is polypropylene glycol.

16. The filling compound of claim 1 wherein the polyolefin chosen is polybutene.

17. A filling compound for filling a core of a light waveguide cable comprising:

approximately 78 to about 95.5 weight percent of a component chosen from the group consisting of polyglycol and polyolefin;
approximately 20 to about 4 weight percent of fumed silica;
approximately 2 to about 0.5 weight percent of silane; and
the polyglycol or polyolefin being reacted with the silane to form a synthetic material that provides a supporting skeleton structure.

18. A filling compound for filling a space between a sheath of a light waveguide lead and a coated fiber located within the sheath comprising:
approximately 94 to about 99 weight percent of a component chosen from the group consisting of polyglycol and polyolefin;
approximately 4 to about 0.5 weight percent of fumed silica;
approximately 2 to about 0.5 weight percent of silane; and
the polyglycol or polyolefin being reacted with the silane to form a synthetic material that provides a supporting skeleton structure.

19. A filling compound for light waveguide leads and cables comprising:
approximately 63 to about 99 weight percent of a component chosen from the group consisting of polyglycol and polyolefin;
approximately 27 to about 0.5 weight percent of fumed silica;
approximately 10 to about 0.5 weight percent of a silane compound; and
the polyglycol or polyolefin being reacted with the silane to form a synthetic material that provides a supporting skeleton structure.

20. The filling compound of claim 19 wherein the silane compound is a multifunctional silane.

21. The filling compound of claim 19 wherein the silane comprises a silane compound having at least one constituent chosen from the group consisting of: alkyl group; alkoxy group; vinyl group; and epoxy group.

22. The filling compound of claim 19 wherein the silane is a silane derivative having the following formula:

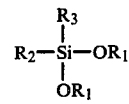

wherein $R_1$ denotes an alkyl group having 1 to 3 carbon atoms, $R_2$ denotes an alkyl group having 1 to 3 carbon atoms or the group $-OR_1$, and $R_3$ denotes an alkyl group having 2 to 4 carbon atoms that are substituted with a substituent of a vinyl, epoxy, mercapto, or alkoxy, cyano- amino- carboxy groups that are reactable with respect to the hydroxyl group.

23. The filling compound of claim 19 wherein the polyglycol is polypropylene glycol.

24. The filling compound of claim 19 wherein at least a portion of the fumed silica is hydrophobic.

* * * * *